(12) United States Patent (10) Patent No.: US 7,930,430 B2
Thatcher et al. (45) Date of Patent: *Apr. 19, 2011

(54) SYSTEMS AND METHODS TO PROVIDE ASSISTANCE DURING ADDRESS INPUT

(75) Inventors: Gregory Garland Thatcher, San Francisco, CA (US); Joshua Robert Russell Jacobson, San Francisco, CA (US); Frank J. Cort, Dublin, CA (US); Adam Michael Smith, San Francisco, CA (US)

(73) Assignee: Xobni Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/499,775

(22) Filed: Jul. 8, 2009

(65) Prior Publication Data

US 2011/0010423 A1    Jan. 13, 2011

(51) Int. Cl.
*G06F 15/16* (2006.01)
(52) U.S. Cl. .................. 709/245; 709/206; 709/226
(58) Field of Classification Search .............. 709/206, 709/226, 245
See application file for complete search history.

(56) References Cited

U.S. PATENT DOCUMENTS

| 6,952,805 | B1* | 10/2005 | Tafoya et al. ........... 715/739 |
| 7,475,113 | B2 | 1/2009 | Stolze |
| 7,512,788 | B2* | 3/2009 | Choi et al. ............. 713/163 |
| 7,725,492 | B2 | 5/2010 | Sittig |
| 7,743,051 | B1 | 6/2010 | Kashyap et al. |
| 7,788,260 | B2 | 8/2010 | Lunt |
| 7,805,492 | B1 | 9/2010 | Thatcher |
| 7,827,208 | B2 | 11/2010 | Bosworth |
| 2002/0049751 | A1 | 4/2002 | Chen et al. |
| 2002/0087647 | A1* | 7/2002 | Quine et al. ............ 709/206 |
| 2002/0103873 | A1 | 8/2002 | Ramanathan et al. |
| 2002/0103879 | A1* | 8/2002 | Mondragon ............ 709/218 |
| 2002/0116396 | A1 | 8/2002 | Somers et al. |
| 2003/0028525 | A1* | 2/2003 | Santos et al. ............ 707/3 |
| 2003/0114956 | A1 | 6/2003 | Cullen et al. |
| 2004/0034537 | A1 | 2/2004 | Gengarella et al. |
| 2004/0215726 | A1 | 10/2004 | Arning et al. |
| 2006/0004892 | A1 | 1/2006 | Lunt |
| 2006/0195474 | A1 | 8/2006 | Cadiz et al. |

(Continued)

FOREIGN PATENT DOCUMENTS

KR     20060056015     5/2006

(Continued)

OTHER PUBLICATIONS

Microsoft Corporation, "About AutoComplete name suggesting," located at http://office.microsoft.com/en-us/outlook/HP063766471033.aspx, 2003.

(Continued)

*Primary Examiner* — Liangche A Wang
(74) *Attorney, Agent, or Firm* — Greenberg Traurig, LLP

(57) ABSTRACT

Systems and methods to provide assistance for completion during address input. In one aspect, a method includes automatically generating profiles for persons identified in messages, such as incoming and outgoing emails. Based on how the addresses of the persons are used in incoming and outgoing messages, the relevancy scores of the addresses are determined. When a user is typing an address, the profiles and the relevancy scores are used to identify and sort suggestions for the completion of the address input.

22 Claims, 5 Drawing Sheets

U.S. PATENT DOCUMENTS

| | | | |
|---|---|---|---|
| 2007/0022447 A1 | 1/2007 | Arseneau et al. | |
| 2007/0123222 A1 | 5/2007 | Cox et al. | |
| 2007/0214141 A1 | 9/2007 | Sittig | |
| 2007/0288578 A1* | 12/2007 | Pantalone | 709/206 |
| 2008/0040370 A1 | 2/2008 | Bosworth | |
| 2008/0040474 A1 | 2/2008 | Zuckerberg | |
| 2008/0040475 A1 | 2/2008 | Bosworth | |
| 2008/0162347 A1 | 7/2008 | Wagner | |
| 2009/0029674 A1 | 1/2009 | Brezina et al. | |
| 2009/0030872 A1 | 1/2009 | Brezina et al. | |
| 2009/0030919 A1 | 1/2009 | Brezina et al. | |
| 2009/0030933 A1 | 1/2009 | Brezina et al. | |
| 2009/0030940 A1 | 1/2009 | Brezina et al. | |
| 2009/0031232 A1 | 1/2009 | Brezina et al. | |
| 2009/0031244 A1 | 1/2009 | Brezina et al. | |
| 2009/0031245 A1 | 1/2009 | Brezina et al. | |
| 2009/0070412 A1 | 3/2009 | D'Angelo | |
| 2009/0077026 A1 | 3/2009 | Yanagihara | |
| 2009/0106415 A1 | 4/2009 | Brezina et al. | |
| 2009/0106676 A1 | 4/2009 | Brezina et al. | |
| 2009/0119678 A1 | 5/2009 | Shih et al. | |
| 2009/0177754 A1 | 7/2009 | Brezina et al. | |
| 2009/0182788 A1 | 7/2009 | Chung et al. | |
| 2010/0030715 A1* | 2/2010 | Eustice et al. | 706/12 |
| 2010/0049534 A1 | 2/2010 | Whitnah | |
| 2010/0164957 A1 | 7/2010 | Lindsay | |
| 2010/0169327 A1 | 7/2010 | Lindsay | |
| 2010/0185610 A1 | 7/2010 | Lunt | |
| 2010/0229223 A1 | 9/2010 | Shepard | |
| 2010/0306185 A1 | 12/2010 | Smith | |

FOREIGN PATENT DOCUMENTS

WO 2007143232 12/2007

OTHER PUBLICATIONS

Carvalho, Vitor R. et al., "Ranking Users for Intelligent Message Addressing," Proceedings of the 30th European Conference on Information Retrieval, Glasgow, England, Mar. 30-Apr. 3, 2008, pp. 321-333.

Elsayed, Tamer et al., "Personal Name Resolution in Email: A Heuristic Approach," University of Maryland Technical Report No. TR-LAMP-150, Mar. 17, 2008.

International Patent Application PCT/US10/34782, International Search Report, Dec. 22, 2010.

International Patent Application PCT/US10/35405, International Search Report and Written Opinion, Jan. 3, 2011.

* cited by examiner

SYSTEMS AND METHODS TO PROVIDE ASSISTANCE DURING ADDRESS INPUT

FIELD OF THE TECHNOLOGY

At least some embodiments of the disclosure relate to user interfaces in general and, more particularly but not limited to, user interfaces for initiating a communication, such as composing an email message or a text message, or dialing a phone call.

BACKGROUND

Many systems and applications have been developed to allow people to communicate with each other. Such systems and applications may provide communication via emails, instant messages, text messages, web/online postings, etc.

Email systems typically use servers to receive the electronic messages from the senders, to store and/or forward the messages on behalf of the senders, and to deliver the messages to the recipients. Since the servers can store the messages for a period of time before delivery, a recipient and a sender do not have to establish a direct communication connection to facilitate the transmission of the electronic message. Thus, the sender and the recipient do not have to be online simultaneously for email communications.

In an email system, an email client application is typically used to receive and display messages and to compose and send messages. The email client application communicates with one or more email servers to receive and send messages. Email addresses are used to identify the recipients of the messages.

An email client application may be a stand alone application running on a user terminal (e.g., a personal desktop or portable computer, a personal digital assistant (PDA), or a smart phone). The email client application stores messages received from one or more email servers, and can display the stored messages to a user even when the user terminal is not connected to the network.

An email client application may also be implemented in part via a server. The server stores the messages on behalf of a user, and when requested, formats a message as a web page for display on a browser used by the user.

Instant messaging (IM) allows real-time communication between people. A communication connection between the devices of the participants in an instant messaging session is required for the delivery of the instant messages sent during the session. User names are typically used to identify the online presence and thus the online addresses (e.g., Internet Protocol (IP) addresses) of the users, which are used to establish the communication connections for the instant messaging session. Therefore, the user names of instant messaging systems can be considered as the addresses for establishing online connections for instant messaging sessions, from the point of view of the users.

Text messaging allows users to communicate via mobile phones over a cellular communications network. Text messages are typically transmitted via Short Message Service (SMS) or Multimedia Messaging Service (MMS). The phone numbers of the mobile phones are used as the addresses of the recipients of the text messages.

Some user terminals (e.g., personal computers, PDA, mobile phones) may support communications in multiple modes, such as email, instant messages, and text messages.

Some applications have been developed to organize address information for users. For example, an address application may store information about a plurality of persons. For each of the persons, the address application may store the name of the person, the email address of the person, the street address of the person, the IM address of the person, the web page address of the person, phone numbers of the person, etc.

SUMMARY OF THE DESCRIPTION

Systems and methods are provided to offer assistance for completion during address input. Some embodiments are summarized in this section.

In one embodiment, a computer implemented method includes: scanning, by a computer, a set of messages of a user to identify a plurality of addresses; identifying, by the computer, names of persons at the addresses to generate profiles for the persons; computing, by the computer, scores of the addresses to determine relevancy of the addresses to the user; in response to an incomplete input in an address field, identifying a set of persons in the profiles that match the incomplete input; sorting the set of persons based at least in part on the scores; presenting one or more suggestions to complete the incomplete input based on the set of persons; and in response to the user selecting a suggestion from the one or more suggestions, replacing by the computer the incomplete input with an address corresponding to the suggestion selected by the user.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, a user terminal is configured to provide assistance for the completion of inputting an address. While the user is typing to provide an input to specify an address for a message, the user terminal uses the incomplete input that has been provided to an address field so far by the user to identify one or more options or suggestions to complete the input, and thus allows the user to complete the input by selecting one.

In one embodiment, the user terminal is configured to search a profile set to search for a portion of the candidates that matches the incomplete input provided by the user. The profile set contains information about a plurality of persons, to whom the user may or may not have previously sent a message.

Figure 1:
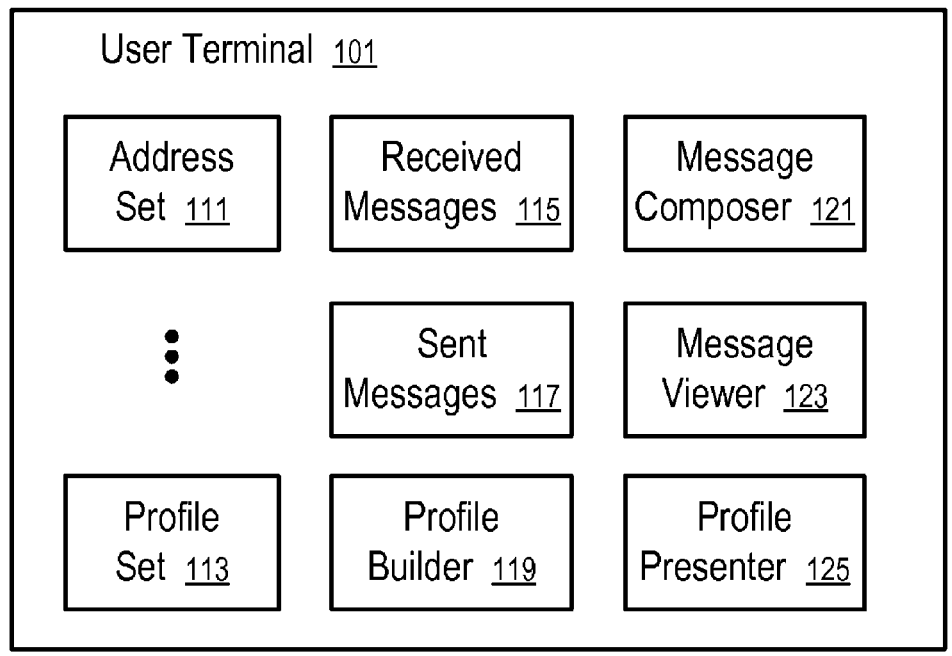
FIG. 1 shows a user terminal to provide assistance in address input according to one embodiment.

FIG. 1 shows a user terminal to provide assistance in address input according to one embodiment. The user terminal may be implemented as a personal computer, a web enabled television set, a personal digital assistant (PDA), or a mobile phone, using special purpose hardware (Application-Specific Integrated Circuit (ASIC) or Field-Programmable Gate Array (FPGA)), software and a general purpose processor, or a combination of special purpose hardware and software. Thus, the disclosure is not limited to a particular implementation.

In FIG. 1, the user terminal (101) is configured to store the messages (115) received at the user terminal (101) and the messages (117) sent from the user terminal (101). The user terminal (101) includes a message viewer (123) which can be used to display a message selected from the received messages (115) or selected from the sent messages (117).

In FIG. 1, the user terminal (101) further includes a message composer (121) which is configured to present a user interface to facilitate the composition of an outgoing message.

In one embodiment, the user terminal (101) is configured to generate an address set (111) based on the addresses that have been specified in the message composer (121) for one or more previously sent messages (117). When an address is used in the message composer (121) to specify a recipient of a message, the address is added to the address set (111), if the address is not already in the address set (111).

In one embodiment, the message composer (121) uses the address set (111) to suggest candidates for the completion of an input when the user is typing an address. For example, when the characters typed in an address field are the same as the first characters in a number of email addresses in the address set (111), the message composer (121) displays the email addresses as possible candidates for the completion of the input.

In one embodiment, the user terminal (101) further includes a profile presenter (125), which can provide suggestions for completion based on the profile set (113) maintained by the profile builder (119).

In one embodiment, the profile builder (119) is configured to extract profile data of various persons based on the received messages (115) and the sent messages (117). The profile builder (119) can extract information about persons not only from the headers of the messages where the senders and the recipients of the messages are specified, but also from the bodies of the messages and from other online sources, such as online directories, social networking websites, web pages, result pages found by search engines, etc.

Since the profile builder (119) obtains the profile data for various persons referenced in the messages (115 and 117), the profile set (113) is more comprehensive than the address set (111).

In one embodiment, the profile builder (119) is configured to scan the received messages (115) and the sent messages (117) for email addresses and names associated with the email addresses. The profile builder (119) generates a profile for each person identified to create the profile set (113). When new messages are received or sent, the profile set (113) is updated based on the new messages.

In some embodiments, the profile builder (119) may further identify persons based on scanning the received messages (115) and the sent messages (117) for phone numbers, names, addresses, etc.

In some embodiments, some or all of the components (111-125) in the user terminal (101) may be hosted on a server remote to the user terminal (101) (e.g., accessible via a web-site and a web browser). For example, in one embodiment, the received messages (115) and the sent messages (117) may be hosted on a web site; and the user can use a web browser to view a selected one of the messages (115 and 117).

For example, the profile builder (119) may be configured to communicate with the server to extract the profile set (113) from the messages (115 and 117) hosted on the server. Alternatively, the profiler builder (119) may also be hosted on the server to build the profile set (113) on the server.

Figure 2:
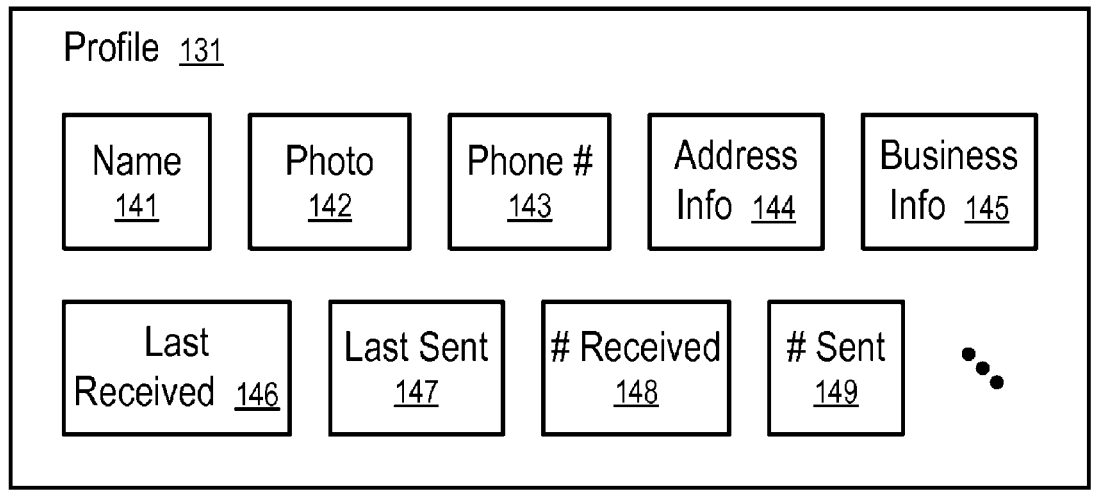
FIG. 2 illustrates a profile of a person according to one embodiment.

FIG. 2 illustrates a profile of a person according to one embodiment. In FIG. 2, the profile (131) includes various fields, such as the name (141) of the person, a photo image (142) of the person, one or more phone numbers of the person (143), address information (144) (e.g., email address, IM address, street address), business information (145) (e.g., employer, work address, job title), the date and time of the last message received from the person (146), the date and time of the last message sent to the person (147), the total number of messages received from the person (148), the total number of messages sent to the person (149), etc.

In one embodiment, the profile builder (119) obtains at least some of the information for the fields from the received messages (115) or the sent messages (117) to identify the person, and then uses other information sources to obtain the data for the other fields in an automated way to collect the profile information on behalf of the user.

For example, the profile builder (119) may use social networks, search engines, photo services, etc. to obtain the photo (142), the business information (145), etc.

Figure 3:
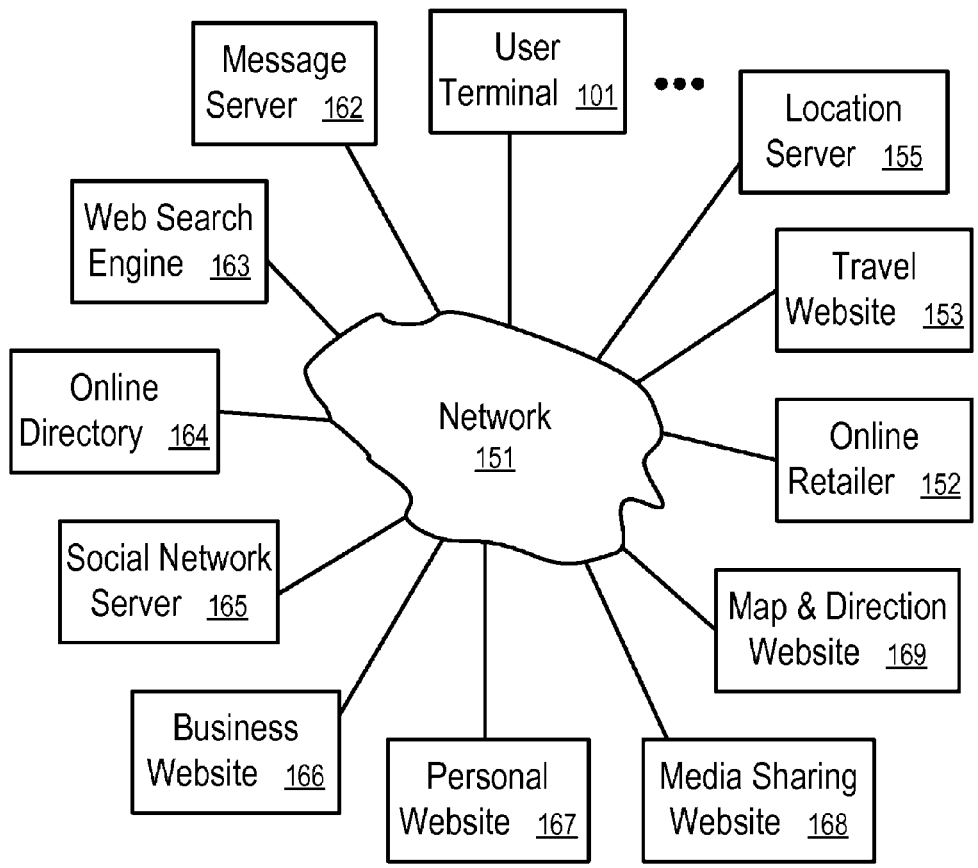
FIG. 3 illustrates a system to obtain data for a profile according to one embodiment.

FIG. 3 illustrates a system to obtain data for a profile according to one embodiment. In FIG. 3, under the control of the profile builder (119), the user terminal (101) may communicate with various servers in an automated way to extract data for the profile (131) over the network (151). The network (151) may include a local area network, a cellular telecommunications network, a wireless wide area network, a wireless local area network, a wireless personal area network, an intranet, and/or Internet.

In one embodiment, the user terminal (101) communicates with the message server (162) to receive and send the messages (115 and 117).

In one embodiment, after the profile builder (119) extracts from the messages (115 or 117) certain information (e.g., an email address, an IM user name, a phone number, and/or a name) about a person, the profile builder (119) uses the extracted information to query various servers to obtain further information (e.g., photo (142), phone number (143), address information (144), and/or business information (145)) about the person to create the profile (131).

For example, the user terminal (101) may query a web search engine (163), an online directory (164), a social network server (165), a business website (166), a personal website (167), a media sharing website (168), a map and direction web site (169), an online retailer (152), a travel website (153), a location website (155), and/or other servers. Information that can be used as search criteria include names, screen names, social network profile names, social network profile URLs, physical addresses, website URLs, email addresses, or telephone numbers. Information that is collected as a result of these queries may be used in future searches to identify additional information that may be used to create a person profile.

For example, the user terminal (101) may receive an email sent by a person via the message server (162). The profile builder (119) of the user terminal (101) is configured to perform a search using the web search engine (163) with the email address of the person as the search criteria. The search engine (163) may return a search result that includes the phone number (143) of the person. The profile builder (119) extracts the phone number (143) from the search result and stores the phone number (143) as part of the profile (131) of the person. The search engine (163) may also return the URL for or link to a personal website (167) belonging to the person. The personal website (167) may contain additional information about the person that may be used to create a person profile, such as additional contact information or biographical information.

In another example, the email address belonging to the person may include an extension (or domain name) for a company. The profile builder (119) of the user terminal (101) is configured to perform a search using the search engine (163) with the email extension (or domain name) as the search criteria. A result returned by the search may be a business website (166). The profile builder (119) of the user terminal (101) is further configured to search the business website (166) to obtain information relevant to the profile (131) of the person. For example, a web page on the business website (166) may contain additional information about the person that may be used to create a person profile, such as business information (145), additional contact information or biographical information.

In another example, the profile builder (119) of the user terminal (101) is configured to perform a search using an online directory (164) (e.g., a person search directory, a yellow page directory) with the name (141) of the person or other contact information as the search criteria. The online directory (164) may return search results that include additional contact information and other information that may be used for the profile (131) of the person.

In another example, the user terminal (101) may receive an email sent by the person via the message server (162). The email may contain a social network user name for the person. The profile builder (119) of the user terminal (101) is configured to extract this social network user name from the email and use it to access the social network server (165). A webpage on the social network server (165) may contain additional contact information and other information that may be extracted and used by the profile builder (119) to create the profile (131) of the person. The webpage on the social network server (165) may also contain additional contacts that may be associated with the person in the profile (131). For example, persons on the friends list of the webpage on the social network server (165), or persons who have posted comments or messages on the social network server (165) may be listed as contacts in a contact network for the person.

In another example, a search performed using the search engine (163) may return a URL or link for a media sharing website (168) (e.g., for sharing photos or videos). The media sharing website (168) may store profile information about the person. Thus, the profile builder (119) of the user terminal (101) can extract additional contact information or biographical information from the media sharing website (168) for the creation of the profile (131) of the person. For example, a profile belonging to the person on a video sharing website may include an instant message screen name (user name) for the person. This screen name may be extracted and displayed as part of the profile (131) of the person.

In one embodiment, information extracted from communications between the person and other users may also be used to update profile information on a social network server (165) or other websites. For example, the profile builder (119) of the user terminal (101) may detect that the person has primarily used email address "david@foo.com" in recent communications, whereas the profile of the person on the social network server (165) shows his email address as "david@bar.com." The profile builder (119) of the user terminal (101) can share the new email address of the person with the social network server (165) to allow the social network server (165) to automatically update the corresponding information about the person, or to suggest the person to make an update based on this changed behavior detected by the profile builder (119) of the user terminal (101).

In one embodiment, the profile builder (119) of the user terminal (101) can also extract information about the person from the travel website (153) and the online retailer (152) for the creation of the profile (131) of the person. For example, after an email containing information about a flight itinerary is received in the user terminal (101), the profile builder (119) of the user terminal (101) may extract a flight number or other information about a flight from the email. The profile builder (119) of user terminal (101) then queries the travel website (153) using the flight number or other flight information as search criteria. Information about the flight, such as the destination city or the departure city, expected departure time, expected arrival time, expected delays, weather in the destination city, weather in the departure city, or any changes to the flight may be used as part of the profile (131) of the person.

In another example, an email containing information about an item or service that the second user is interested in purchasing may be received in the user terminal (101). The profile builder (119) of user terminal (101) is configured to query one or more search engines, websites, or on-line retailers (152) to determine which retailer or website has the best price or currently has the item in stock or the service available. This information is extracted by the profile builder (119) and displayed by the profile presenter (125) as part of the profile (131) of the person.

In one embodiment, the profile builder (119) of the user terminal (101) can also extract information from a map and direction website (169) and location servers (155) as part of the profile (131) of the person. For example, the person may own a GPS unit, cell phone, or other device that is capable of transmitting the person's current physical location to the location server (155), which allows other users to access the person's current location information. If the user of the user terminal (101) has permission to view the location information of the person, the profile builder (119) of the user terminal (101) may access the location server (155) over the network (151) to receive location information about the person. This location information can be displayed as part of a person profile.

The profile builder (119) of the user terminal (101) may also access the map and direction website (169) to create a map of the current location of the person, or to generate directions to the current location of the person. The map or directions may be displayed by the profile presenter (125) as part of the profile (131) of the person. The map and direction website (169) may also be used to generate a map or directions to one or more known street addresses of the person, such as a work address or home address. The map or directions can be displayed by the profile presenter (125) as part of the profile (131) of the person.

Figure 4:
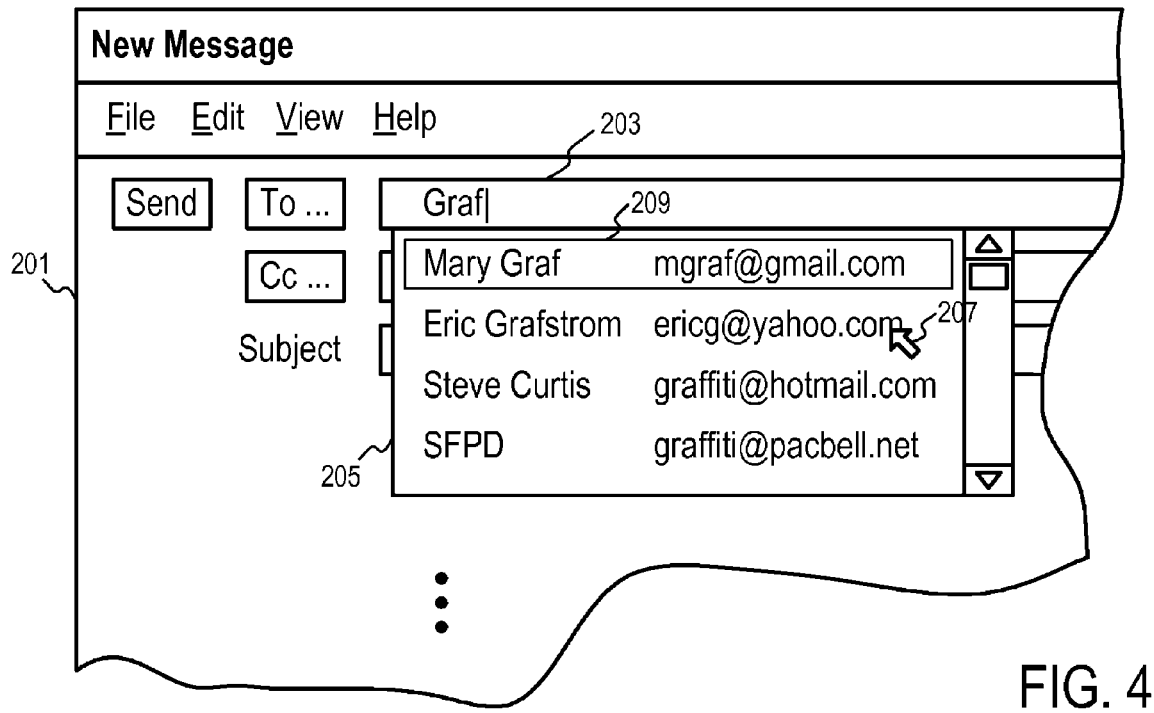
FIG. 4 illustrates a user interface to provide assistance in address input according to one embodiment.

FIG. 4 illustrates a user interface to provide assistance in address input according to one embodiment. In FIG. 4, the user interface (201) is configured for composing an outgoing message. The user interface (201) includes entries to specify the addresses of the recipients of the message. For example, the entry box (203) is configured to receive the email address of an outgoing email, which may be sent from the user terminal (101) via the message server (162).

In one embodiment, when the entry box (203) detects a change in the content received in the entry box (203) (e.g., a keystroke is received in the entry box (203), as the user types a letter on a keyboard to provide an input), the profile presenter (125) determines a set of suggestions for the completion of the input in the entry box (203). The profile presenter (125) uses the incomplete input in the entry box (203) as a search criterion to find from the profile set (113) a set of suggestions for the complete address input. The suggestions are presented in the window (205) as a selectable list.

In one embodiment, when the message composer (121) has an existing, native mechanism for displaying suggestions (e.g., making suggestions based on address set (111)), the profile presenter (125) can be configured as an add-on module to display these suggestions as well and to hide the native mechanism of the message composer (121) for displaying suggestions.

In FIG. 4, the item (209) on the top of the list is highlighted; and the user may select the highlighted item (209) with a keystroke (e.g., pressing Tab key, Enter key, Home, End, PgUp, PgDown, etc.). The user may use the arrow keys to move the highlight up or down the list to highlight a different item, or provide additional input in the entry box (203) to cause the profile presenter (125) to update the suggestions in the window (205). The user may also use the cursor (207) to select an item using a cursor control, such as a mouse, a track ball, a touch pad, a touch screen, etc.

In one embodiment, when the message composer (121) has an existing, native mechanism that uses these keys for the display of suggestions, the profile presenter (125) configured as an add-on module can hide these keystrokes from the native mechanism. For example, the In one embodiment, after an item is selected from the list presented in the suggestion window (205), the address represented by the item is inserted by the profile presenter (125) into the entry box (203) to replace the corresponding portion that is used to suggest the selected item; and the suggestion window (205) is closed automatically.

In some embodiments, the message composer (121) may be configured to perform post-processing, such as name checking, on the inserted text in the entry box (203) a few moments after the text has been inserted. The insertion by the profile presenter (125) is performed in a way that allows such post-processing by the message composer (121) to continue functioning. For example, if the message composer (121) loses focus or activation, it starts post-processing the entries in the textbox. The profile presenter (125) is configure temporarily prevent this from happening while the suggestion window (205) is visible and causes this to happen when the suggestion window (205) is closed. To hide the suggestion window (205), the suggestion window (205) is configured as a topmost window that is initially not activated. The Outlook textbox window is subclassed via a code-injection mechanism to temporarily preventing it from getting "kill focus" messages (e.g., through intercepting such messages, and then throwing them away). After the suggestion window (205) becomes invisible, the profile presenter (125) sets the focus back to the textbox window and causes the post-processing to be performed.

For example, in FIG. 4, the incomplete input "Graf" is received in the entry box (203). The cursor "|" in the entry box (203) indicates the insertion point for subsequent keystrokes received in the user terminal (101). While the entry box (203) is expecting additional input from the user, the profile presenter (125) uses the incomplete input "Graf" to identify a set of suggestions, such as mgraf@gmail.com for Mary Graf, ericg@yahoo.com for Eric Grafstrom, graffiti@hotmail.com for Steve Curtis, graffiti@pacbell.net for SFPD, etc., based on the profile set (113) established by the profile builder (119).

In one embodiment, the suggestions are identified by matching the incomplete input with names, addresses and/or other profile data of the persons in the profile set (113). The incomplete input may match the beginning of a last name, the beginning of a first name, the beginning of the name of an organization, the beginning of a domain name of an email address, the beginning of the top level domain name of an email address, the beginning of the email prefix, the beginning of a word in the job title (or the beginning of the job title), the beginning of the city of the person, etc. In some embodiments, when an email prefix contains one or more separators, such as "_" or or "-", the email prefix is broken down into segments or chunks; and the incomplete input may be match the beginning of any of the segments or chunks. When there is a match, the person can be selected as a candidate for the suggestions. Thus, the searching for a match is not limited to matching the beginning of an address that the user has previously typed for a previous outgoing message.

In FIG. 4, the top item, mgraf@gmail.com for Mary Graf, is highlighted and can be selected by pressing the Tab key or the Enter key. Alternatively, the user may select the second item, ericg@yahoo.com for Eric Grafstrom, by pressing a mouse button while the cursor (207) is over the second item. The profile presenter (125) is configured to use the selected address to replace the incomplete input "Graf" received in the entry box (203).

In FIG. 4, if the user further types a letter "f", the profile presenter (125) will use the incomplete input "Graff" to eliminate some suggestions (e.g., mgraf@gmail.com for Mary Graf, ericg@yahoo.com for Eric Grafstrom) and update the list in the suggestion window (205).

Thus, the profile presenter (125) uses the profile set (113) to identify suggestions based on incomplete input provided in the entry box (203) and to allow the user to select a suggestion to complete the input.

FIG. 4 illustrates an example in which the suggestion window (205) is presented to provide suggestions for the completion of an address input in the "To" field of the user interface (201) for composing an outgoing message. Similar suggestions can be provided when the user is typing in other fields that are configured to receive address inputs, such as the "CC" field, or "BCC" field, of a user interface for composing an outgoing email message. Further, the suggestions can be provided when the user is typing in other types of user interfaces that are configured to receive address inputs, such as a user interface to edit a contact entry, a profile page, etc. Thus, the invention is not limited to the user interface for composing an email message.

Figure 5:
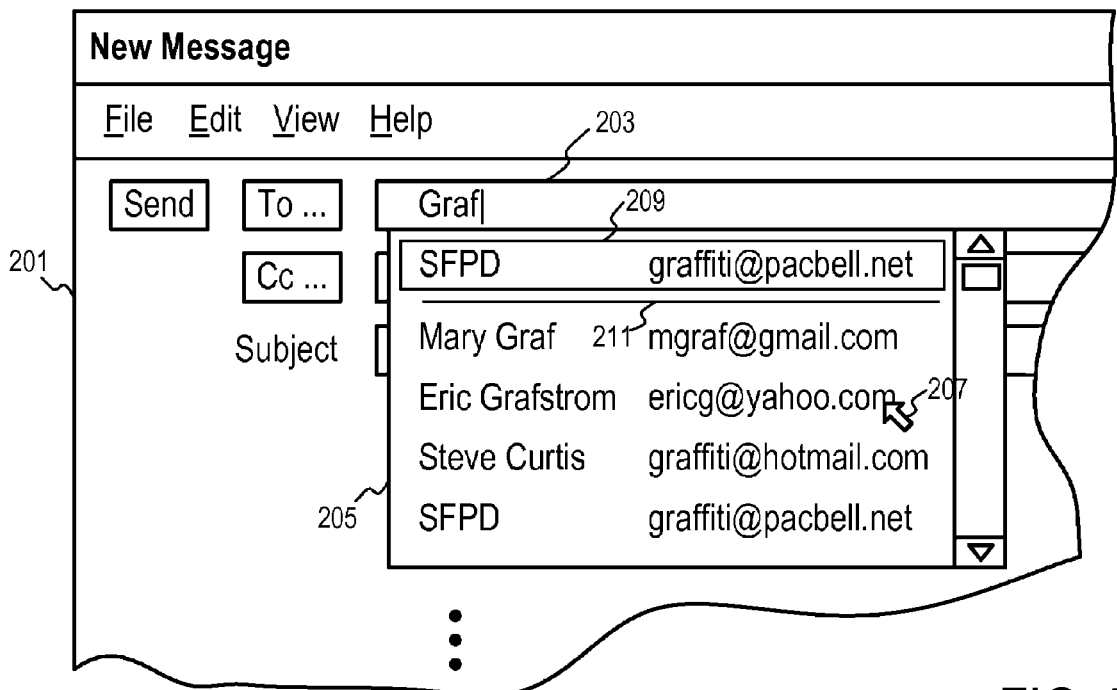
FIG. 5 illustrates another user interface to provide assistance in address input according to one embodiment.

FIG. 5 illustrates another user interface to provide assistance in address input according to one embodiment.

In FIG. 5, the suggestions are presented as two parts. The part above the separator (211) is identified from the address set (111) and the part below the separator (211) is identified from the profile set (113).

In one embodiment, the address set (111) is generated by collecting the addresses that have been previously specified in the address fields of the message composer (121) of the user terminal (101). In one embodiment, the suggestion above the separator (211) is identified by matching the incomplete input "Graf" with the starting letters of the addresses in the address set (111). The addresses in the address set (111) that have the leading characters "graf" are selected to generate the suggestions above the separator (211).

In one embodiment, the message composer (121) has an existing, native mechanism for displaying suggestions (e.g., making suggestions based on address set (111)). The profile presenter (125) is configured to obtain the suggestions from the native mechanism (e.g., via scraping, inspecting, querying, etc.) and displays the suggestions above the separator (121).

In one embodiment, the suggestions presented above the separator (211) are identified by the message composer (121). The profile presenter (125) obtains the suggestions from the message composer (121), presents the suggestions in the suggestion window (205), hide the suggestions the message composer (121) would have shown (and thus prevents the message composer (121) from presenting the suggestions in a separate window).

In another embodiment, the profile presenter (125) shows the suggestions based on the profile set (113) in one suggestion window; the message composer (121) shows the suggestions in a different suggestion window; and the profile presenter (125) aligns its suggestion window with the suggestion window of the message composer (121) so that the two suggestion windows appear like two panels of a large window. Alternatively, the profile presenter (125) presents its suggestion window over the suggestion window of the message composer (121) (to cover up and thus effectively disable the suggestion window of the message composer (121)). In one embodiment, the profile presenter (125) causes the suggestion window of the message composer (121) to be invisible on subsequent invocations to hide the suggestion window of the message composer (121).

In another embodiment, the profile presenter (125) uses the address set (111) to identify the suggestions presented above the separator (211) in the suggestion window (205), using the same approach the suggestion window of the message composer (121) would use.

In one embodiment, the profile presenter (125) includes an auto suggest manager. The auto suggest manager can turn on or turn off the feature of auto suggestions generated based on the profile set (113) in accordance with the preferences of the user. The auto suggest manager provides encapsulation, providing an easy interface for external applications to use the auto suggest feature without understanding its implementation. It provides a mechanisms to add the auto suggest feature to a new window (message, contact, etc.), to "clean up" or remove the auto suggest feature from a window or all windows, to allow logging of auto suggest state and problems, and to determine any special preferences the user may have set in the native client (e.g., Outlook).

In one embodiment, the profile presenter (125) includes a suggestion window (205) that presents a dialog box or a list box to show the suggested results. The profile presenter (125) includes a view controller to show or hide the suggestion window (205). The view controller also positions the suggestion window (205) in the correct location (which varies as the user types in text), participates in "hiding" the suggestion window (205) from the native application (e.g., Outlook) so that the native application is not aware of the existence of the suggestion window (205), and notify other modules of navigation commands (PgUp, PgDown, etc.) and user selections. When a selection or keyboard command (e.g., arrow keys, tab return) related to the suggestions occurs, the suggestion window (205) (or a keyboard hook or the inspector controller, discussed below) provides messages to the view controller for processing.

In one embodiment, the profile presenter (125) further includes a result controller, which decides what results to show and when. After the profile presenter (125) detects that the user is typing in an address field (e.g., To, CC, or BCC fields of a window to compose an email), the result controller uses the incomplete input as a search criterion to search for the suggestions based on the profile set (113) and/or based on the address set (111). The view controller causes the display of the suggestion window (205) to show the search results. If the user selects a suggestion from the window (205), the address corresponding to the user selection is put into the address field.

In one embodiment, the profile presenter (125) is implemented as an add-on module for an existing communications client, such as Microsoft Outlook, which can make suggestions by selecting from the address set (111) the email addresses that start with the incomplete input typed by the user in the address field. The suggestion window (205) of the profile presenter (125) subclasses the suggestion window of the existing communications client; and the profile presenter (125) hides the suggestion window of the existing communications client and creates a keyboard hook as wells as a subclass mechanism using code-injection to intercept keyboard messages and other messages sent to the hidden suggestion window of the existing communications client to prevent it from processing these keys (e.g. PgUp, PgDown, Tab, Return), and also to cause it to process fake keystrokes or other messages (e.g. to implement "delete" functionality"). In one embodiment, the keyboard hook is a global WH_KEYBOARD_LL hook; in another embodiment, the keyboard hook is a WH_KEYBOARD hook. In one embodiment, the profile presenter (125) creates only one such keyboard hook per thread (especially for the WH_KEYBOARD hook).

In one embodiment, the result controller is configured to handle a rapidly typing user, by stopping a previous search and then starting a new search. For example, if a search for suggestions is started based on the initial input "er" and before the suggestions are displayed the user further typed "ic" to provide the input "eric", the result controller stops the search for suggestions based on "er" and starts a new search for suggestions based on "eric".

In one embodiment, an inspector controller is used to hook the functionalities of the profile presenter (125) with the existing communications client, which may be the message composer (121) in one embodiment. When a window for the message composer (121) is constructed and shown, the inspector controller determines whether the user is typing in a field (e.g., entry box (203)) that is configured to receive an address. If the user is typing in an address field, the inspector controller instantiates a keyboard hook to obtain what the user types in the address field to allow the profile presenter (125) to generate the suggestions based on the profile set (113).

In one embodiment, the inspector controller determines if the window should have auto suggest functionality. Read-only windows or unsupported type of windows should not have the auto suggest functionality. The inspector controller then searches for suitable textboxes (using a "Control Calculation mechanism") that should have auto suggest functionality attached to them. Since the native client (e.g., Outlook) has many configurations ("use Word Editor", use "RTF Editor", etc.), different mechanisms are used and a fallback mechanism in case the initial search for a suitable window fails, and in some cases, additional code injection is required because the native client (e.g., Outlook) uses a different process for different windows. The inspector controller uses a "SetProp" mechanism to "remember" which windows have already been subclassed so that auto suggest functionality is correctly added to the newest window. Additionally, the inspector controller keeps track of which textbox (To, Cc, Bcc, etc.) the user is currently using. The inspector controller also is responsible for putting the user's selection (from the dialog) into the selected textbox control. The inspector controller also watches for various windows message in the various subclassed windows (e.g. Activation, Focus, Keyboard), "hiding" (or "eating") some of these message from the native client (e.g., Outlook) so as not to break other existing functionality of the native client (e.g., Outlook), and using others to notify the view controller that it should hide or show or change the suggestion window (205). In addition to the subclass of the "TextBox" and "Outlook AutoSuggest" window, the main composer window is subclassed as well, and may subclass others in the future. Note that this subclassing mechanism is implemented using code injection and could in the future also be implemented using other mechanisms. Code injection "injects" our code into another program (e.g. Outlook or Word) while it is running.

In one embodiment, the inspector controller subclasses the textbox (and also the parent window) into which the user is typing to receive the keys typed by the user, generate requests for new suggestions in response to keys typed by the user, scroll through the suggestions (e.g., when the user presses arrow keys), indicate a selection by the user (e.g., when the user presses Tab or Enter key) (some embodiments use subclass, some embodiments keyboard hook), the profile presenter (125) hide these keystrokes from the native client (e.g., Outlook window) (by "eating" or consuming the messages), and hide the suggestion window (205) when the keyboard focus is moved out of the textbox or user has activated another application or user has finished selection. The inspector controller instantiates the view controller to process the user input and subclasses the suggestion window of the message composer (121) to create the suggestion window (205). The inspector controller (or the keyboard hook) contacts the view controller to process the user inputs when various keys are received in the textbox in which the user is typing.

In one embodiment, a window driver is used to work with the message composer (121) to obtain current caret position (the position of the text insertion point indicator). In response to the requests from the inspector controller and the suggestion window (205), the window driver may selectively block messages from being passed on to other windows. When a selection is made, the window driver is configured to replace the incomplete input in the address field with the address corresponding to the selection.

In one embodiment, the profile presenter (125) is implemented as an add-on module to a native client, such as Outlook. The Outlook textbox windows are in some cases "rich edit controls" which allow other controls to be embedded in them. The profile presenter (125) walk both the text and these embedded COM controls using COM (also known as OLE or ActiveX programming) to determine where the user is currently entering text (ignoring any other text or embedded controls before or after the current email address) so that the profile presenter (125) can correctly determine where the current user's entry begins and ends, what text to use to create suggestions for, and also which part of the text (or embedded controls) to replace.

In one embodiment, the profile presenter (125) uses a person-centric approach to identify the suggestions. The partial input (e.g., "Graf" received in the entry box (203)) is used to match the names of the persons to identify the persons in the profile set (113) (e.g., the first name, the last name, the nickname, etc.). The profile presenter (125) sorts the matched persons based on a relationship score determined from the statistical data derived at least in part from the received messages (115) and the sent messages (117).

Figure 6:
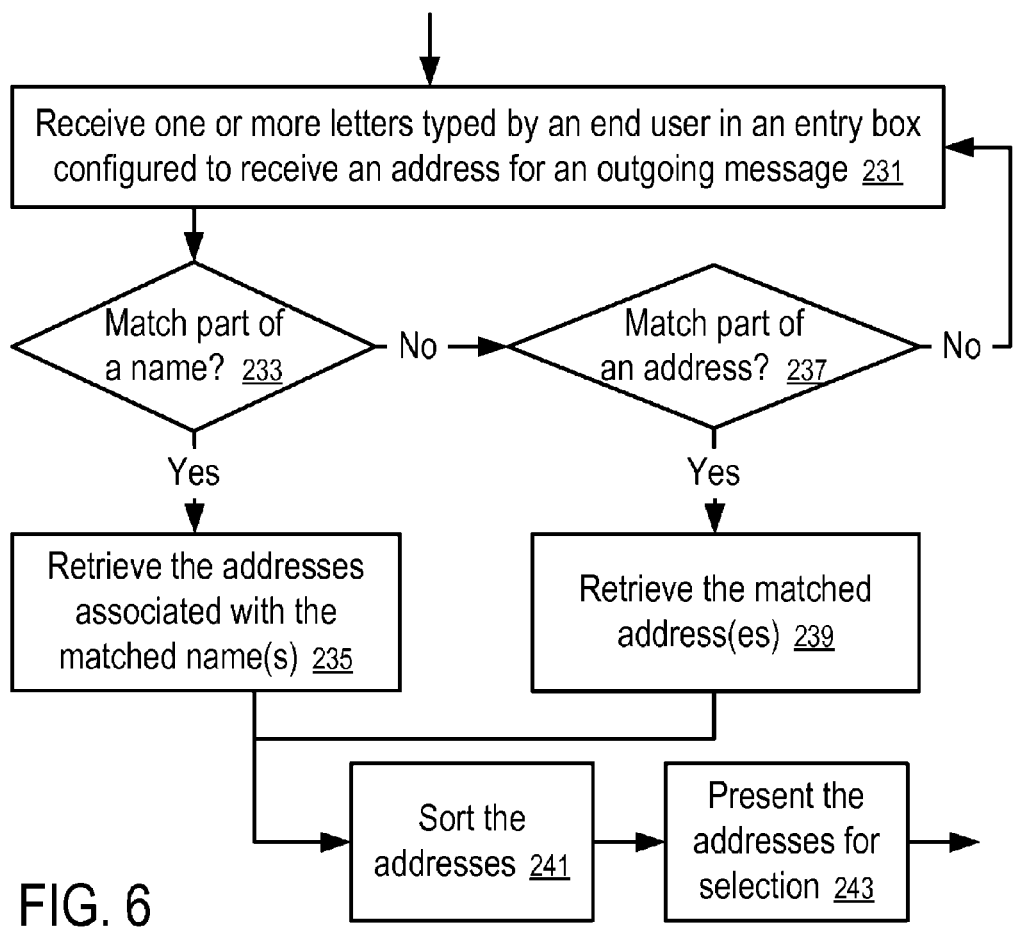
FIG. 6 shows a method to select suggestions to complete address input according to one embodiment.

FIG. 6 shows a method to select suggestions to complete address input according to one embodiment.

In FIG. 6, after receiving (231) one or more letters that are typed in by an end user in an entry box configured to receive an address for an outgoing message, the profile presenter (125) determines (233) whether the one or more letters match part of a name in the profile set (113). If there is a match (or more than one match), the profile presenter (125) retrieves (235) the addresses associated with the matched name(s), sorts (241) the addresses, and presents (243) the addresses for selection in suggestion window (205).

In FIG. 6, if there is no name that matches the one or more letters, the profile presenter (125) determines (237) whether the one or more letters match part of an address in the profile set (113). If there is a match (or more than one match), the profile presenter (125) retrieves (239) the matched address (es), sorts (241) the addresses, and presents (243) the addresses for selection in suggestion window (205).

Thus, the user can input the names of the recipient to cause the profile presenter (125) to identify the persons with names matching the input to select the person and thus select the address of the person. The names of the recipient do not have to be part of the addresses to be matched and suggested.

In one embodiment, when a person has multiple addresses, the suggestion window (205) shows multiple suggestions for the addresses presented with the name of the person.

In another embodiment, when a person has multiple addresses, the suggestion window (205) shows one entry to suggest the person. If the person is selected, the suggestion window (205) is then updated to show a list of addresses of the person. If the user selects one or more addresses, the profile presenter (125) replaces the name of the person with the selected address(es) of the person; if the user does not select any of the multiple addresses, the profile presenter (125) replaces the name of the person with all of the multiple addresses. In one embodiment, if the user does not select any of the multiple addresses of the person, the profile presenter (125) replaces the name of the person with the top ranked address of the person in the To field and inserts the other addresses of the person in the CC or BCC field (or uses the top ranked address without using the other addresses of the person).

In FIG. 6, the profile presenter (125) attempts to first match names of the persons in the profile set (113) and, if there is no match in names, then match addresses of the persons in the profile set (113).

In another embodiments, the profile presenter (125) may perform a search to match the beginning of a number of fields in the profile set (113), such as, different fields of names of the persons in the profile set (113), different segments of email addresses of the persons in the profile set (113), the names of cities (or states or countries) of the persons in the profile set (113), different words in the street addresses of the persons in the profile set (113), different words of job titles of the persons in the profile set (113), screen names of the persons in the profile set (113), etc. Examples of different fields of names include first name, last name, middle name, nick name, etc. Examples of different segments of email addresses include segments or chunks of an email prefix separated by a separator, such as "-", ".", or "_", different levels of domain names of an email address, etc. In some embodiments, the names of the persons are as part of the email addresses. In some embodiments, the names are from fields separated from the email addresses.

When the profile presenter (125) searches different types of fields, a match in different types of fields may be weighted differently. For example, a match in a name field may be given a first weight (e.g., 10), a match in an email prefix segment may be given a second weight (e.g., 8), a match in the top level domain name may be given a third weight (e.g., 1), and a match in other domain names (e.g., second level domain name, or lower level domain names) may be given a fourth weight (e.g., 2), etc. When a person or an address has multiple matches in different fields, the weights for the multiple matches may be added to compute the weight for the person or address. Alternatively, the highest weight for the multiple matches can be selected as the weight for the person or address. The weights for the matched persons or addresses can be used to sort the persons or addresses for selection of up to a predetermined number of suggestions for presentation to the user. For example, the weights can be applied to the relevancy scores of the matched persons or addresses to determine relevancy scores for suggesting the persons or addresses; and the profile presenter (125) selects up to a predetermined number of matched persons or addresses that have the highest relevancy scores for suggesting the persons or addresses.

In FIGS. 4 and 5, the suggestions presented based on the profile set (113) are shown as a list of entries, where a typical entry includes the name and the address of the person. However, in other embodiments, the entries may further include other information, such as a photo image of the person, a job title of the person, a business association of the person, etc. In some embodiments, other details of the profile of the person are shown in a separate window when the cursor is positioned and remains positioned on the entry for the person (e.g., hovering over the entry).

In one embodiment, the profile presenter (125) ranks the persons for the suggestions to complete the address input, based on the relevancy index between the suggested persons and the user of the user terminal (101). When dealing with long lists of contacts, such a relevancy index helps users find the most relevant contacts first.

In one embodiment, the profile builder (119) scans the messages (115 and 117) to capture the addresses of the senders and recipients of the messages (115 and 117). Each of the captured addresses is stored in an index file. When one of those addresses is seen in a header that describes the recipients and senders, the score for the address is increased by a predetermined amount (e.g., 1). In some embodiments, the profile builder (119) further scans the body of the messages (115 and 117) to identify additional addresses.

In some embodiments, different weights/amounts are given to the score when the addresses are used in different fields (e.g., From, Reply-To, To, CC, and BCC fields of emails). For example, an amount of 3 may be given to the score when an address is found in a field that identifies the sender of the message (e.g., From or Reply-To fields of emails received by the user of the user terminal (101)); and an amount of 1 may be given to the score when the address is found in a field that identifies the recipient of the message (e.g., To, CC, and BCC fields of emails sent from the user of the user terminal (101)).

In some embodiments, the same amount is given to the score regardless of the type of fields in which the address is used (e.g., From, Reply-To, To, CC, and BCC fields of emails).

In some embodiments, the length of the elapsed time period since receipt of the message is further used to determine the amount given to the score. The occurrence of an address in a recent message can be given more weight than the occurrence of the address in a message received/sent earlier than the recent message.

Thus, after the messages (115 and 117) are processed, each of the addresses has a relevancy score. The higher the score, the more relevant the address is to the user of the user terminal (101).

In some embodiments, the relevancy score is computed from the data in the profile (131), such as the total number of messages received from the person (148), the total number of messages sent to the person (149), etc. In some embodiments, the number of messages are counted based on the types of fields in which the addresses appear and the time periods in which the messages are sent or received.

In one embodiment, the profile builder (119) further groups the addresses by the names of the corresponding persons. Each person having a name in the profile set (113) may have one or more addresses. In one embodiment, the scores for the addresses of the person are summed to generate a score for the person. Thus, the higher the score, the more relevant the person is to the user of the user terminal (101).

In one embodiment, when the suggestions are presented as a list of addresses, the scores for the addresses are used to sort the addresses. When the suggestions are presented as a list of persons, the scores for the persons are used to sort the list of names of the persons.

In another embodiment, the suggestions are presented as a list of addresses grouped according to the persons. The addresses for each person are grouped together and sorted within the group based on the scores of the emails. The groups are sorted according to the scores of the persons.

In one embodiment, the profile presenter (125) selects up to a predetermined number (e.g., 10) of candidates, after sorting the candidates for the suggestions based on the relevancy scores. The selected candidates are presented in the suggestion window (205) to help the user. Less relevant candidates are not presented in the suggestion window (205).

While some of the embodiments are discussed here in the context of composing an email message, the techniques disclosed here can also be applied to the specifying of address information for instant messaging, text messaging, dialing a phone number, etc. Instead of matching the incomplete input to the exact address, the profile presenter (125) can match the incomplete input with identifiers of the persons in the profile set (113) to identify the persons as the basis for suggestions. Examples of identifiers include nickname, first name, last name, company name, domain name, user name, screen name, phone number, etc. In one embodiment, the suggestions are searched and presented in the form of suggested persons and thus, the suggestions are person-centric.

In some embodiments, the user terminal (101) may include different communication components that require address information for different types of communications, such as email, instant messages, text messages, phone calls, etc. The profile presenter (125) may use the profile set (113) to generate the suggested candidates for completing an address input for the different types of communications.

In some embodiments, the relevancy score is computed for the person without considering the type of communications. In other embodiments, the addresses having the same type as the address to be suggested are given more weight than other types of addresses. For example, when ranking the persons for suggesting addresses for instant messaging, the addresses for instant messaging may be given more weight than addresses for other types of communications, such as email, phone calls, etc. Thus, for different types of communications, the profile presenter (125) may suggest different lists of persons based on the same profile set (113) and the same incomplete input.

Figure 7:
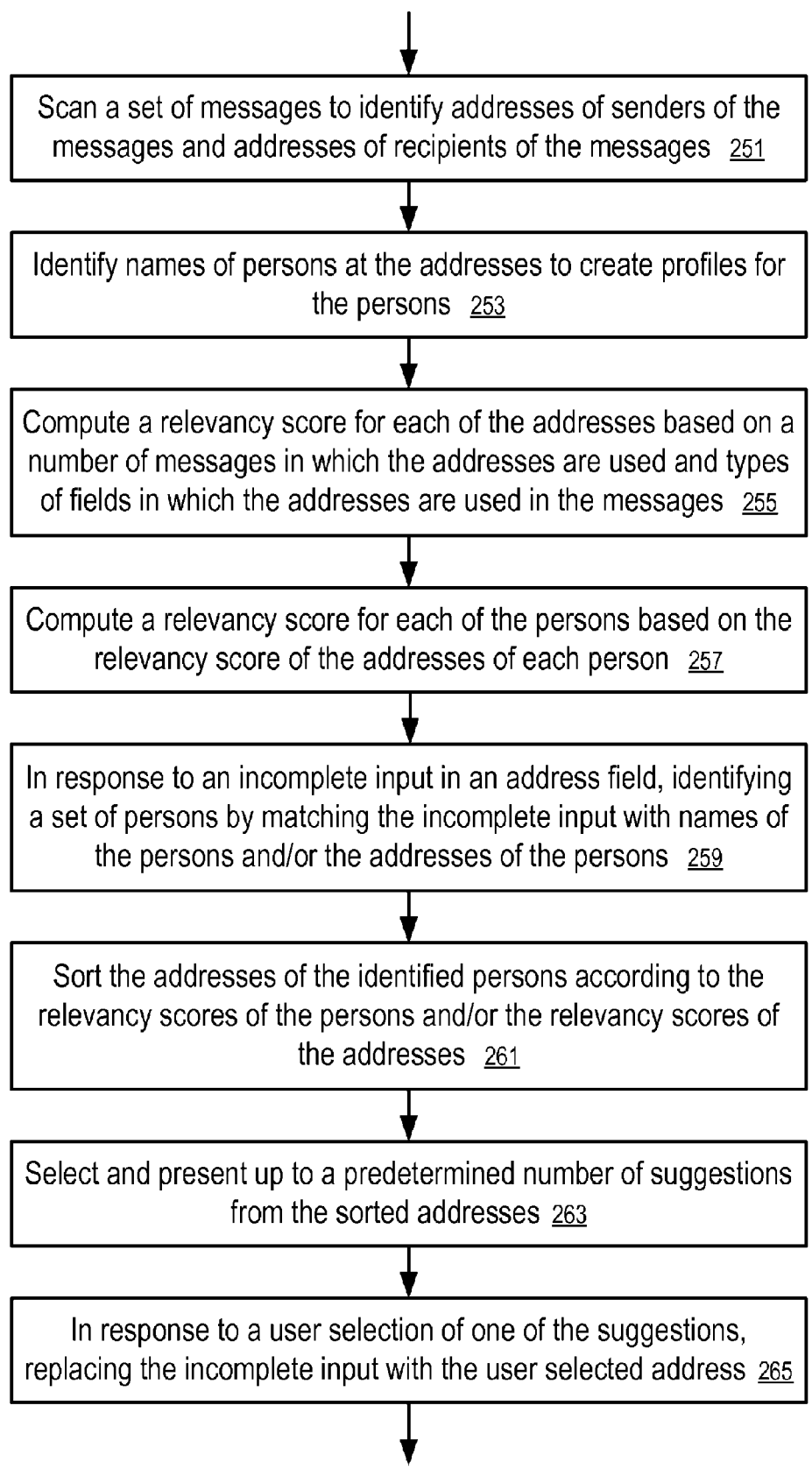
FIG. 7 shows a method to provide address assistance according to one embodiment.

FIG. 7 shows a method to provide address assistance according to one embodiment. In FIG. 7, the profile builder (119) scans (251) a set of messages (115 and 117) to identify addresses of senders of the messages and addresses of recipients of the messages in an automatic way, for example, when the profile builder (119) is installed and/or when the messages (115 and 117) are received or sent.

The profile builder (119) identifies (253) the names of persons at the addresses to create profiles (131) for the persons, based on scanning the messages (115 and 117) and/or querying other data sources in an automated way, such as the web search engine (163), online directory (164), social network server (165), and other websites.

In one embodiment, the profile builder (119) computes (255) a relevancy score for each of the addresses based on a number of messages in which the addresses are used and types of fields in which the addresses are used in the messages. For example, instances where an address is used to specify a recipient of a message sent from the user of the user terminal (101) may be given more weight than instances where the address is used to specify a sender of a message received by the user of the user terminal (101).

In one embodiment, the profile builder (119) also computes (257) a relevancy score for each of the persons based on the relevancy score of the addresses of each person.

In FIG. 7, in response to an incomplete input in an address field, the profile presenter (125) identifies (259) a set of persons by matching the incomplete input with names of the persons and/or the addresses of the persons. The profile presenter (125) sorts (261) the addresses of the identified persons according to the relevancy scores of the persons and/or the relevancy scores of the addresses, and selects and presents (263) up to a predetermined number of suggestions from the sorted addresses. In response to a user selection of one of the suggestions, the profile presenter (125) replaces (265) the incomplete input with the user selected address.

Figure 8:
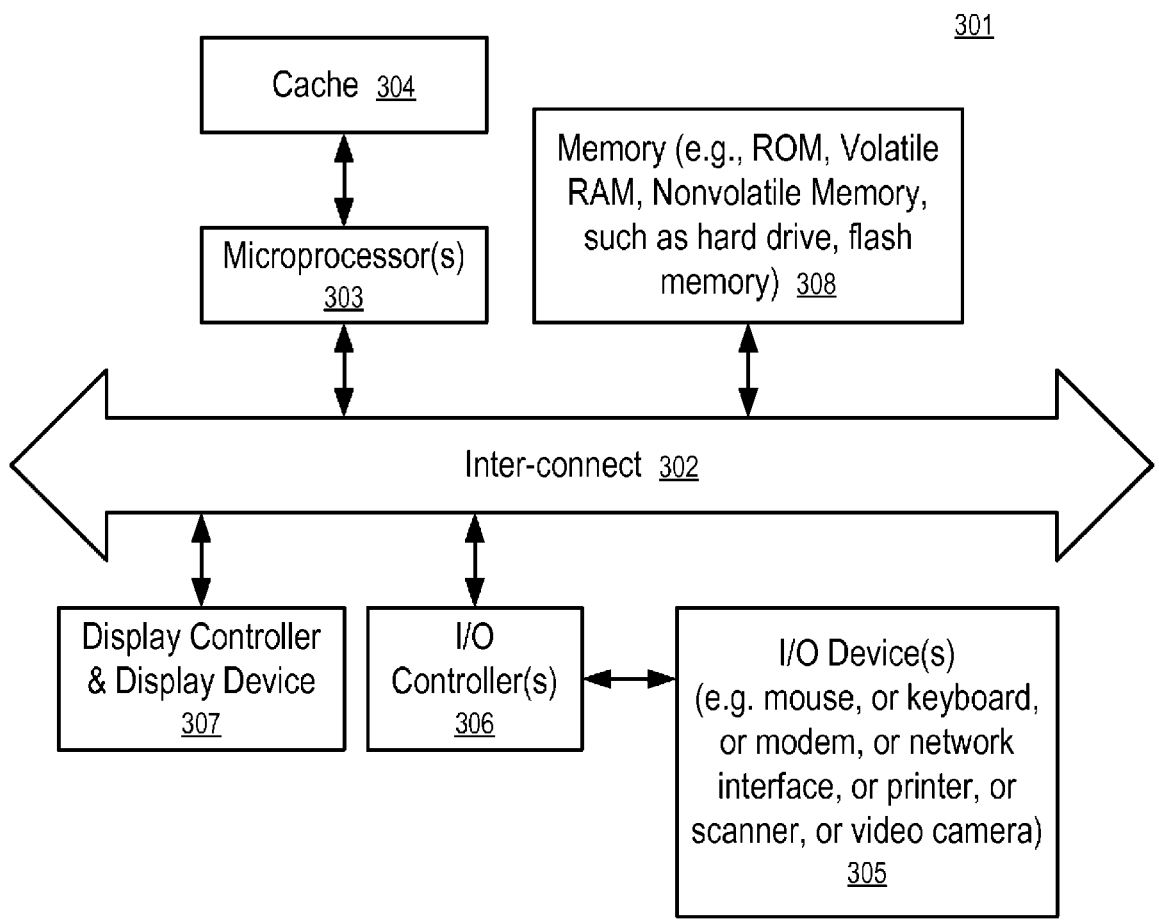
FIG. 8 shows a data processing system, which can be used in various embodiments.

FIG. 8 shows a data processing system, which can be used in various embodiments. While FIG. 8 illustrates various components of a computer system, it is not intended to represent any particular architecture or manner of interconnecting the components. Some embodiments may use other systems that have fewer or more components than those shown in FIG. 8.

In one embodiment, the user terminal (101) can be implemented as a data processing system, with fewer or more components, as illustrated in FIG. 8. When one or more components of the user terminal (101) are implemented on one or more remote servers, the servers can be implemented as a data processing system, with fewer or more components, as illustrated in FIG. 8.

In FIG. 8, the data processing system (301) includes an inter-connect (302) (e.g., bus and system core logic), which interconnects a microprocessor(s) (303) and memory (308). The microprocessor (303) is coupled to cache memory (304) in the example of FIG. 8.

The inter-connect (302) interconnects the microprocessor(s) (303) and the memory (308) together and also interconnects them to a display controller, display device (307), and to peripheral devices such as input/output (I/O) devices (305) through an input/output controller(s) (306).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (302) may include one or more buses connected to one another through various bridges, controllers and/or adapters. In one embodiment, the I/O controller (306) includes a USB (Universal Serial Bus) adapter for controlling USB peripherals, and/or an IEEE-1394 bus adapter for controlling IEEE-1394 peripherals.

The memory (308) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any apparatus that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer implemented method, comprising:
scanning, by a computer, a set of messages of a user to identify a plurality of addresses;
identifying, by the computer, names of persons at the addresses to generate a plurality of profiles for the persons, each profile of the plurality of profiles comprising a name of a respective person, an address for the respective person, a date of the last message sent to or received from the respective person, and a total number of messages sent to or received from the respective person;
computing, by the computer, scores of the persons using data in the plurality of profiles to determine relevancy of the persons to the user;
in response to an incomplete input in an address field, identifying a set of persons in the plurality of profiles that match the incomplete input;
sorting the set of persons based at least in part on the scores;
presenting to the user, in an order determined by the sorting, one or more suggestions to complete the incomplete input based on the set of persons; and
in response to the user selecting a suggestion from the one or more suggestions, replacing, by the computer, the incomplete input with an address corresponding to the suggestion selected by the user.

2. The method of claim 1, wherein the computer comprises a user terminal storing the set of messages.

3. The method of claim 2, wherein the set of messages includes messages received at the user terminal for the user and messages sent by the user from the user terminal.

4. The method of claim 1, further comprising computing scores of the addresses to determine relevancy of the addresses to the user, wherein a score of one address of the addresses is based on a first number of instances the address is used to identify a sender of messages sent to the user and a second number of instances the address is used to identify a recipient of messages sent from the user.

5. The method of claim 4, wherein the second number of instances is provided with more weight than the first number of instances in determining the score.

6. The method of claim 5, wherein an instance of the address used in a message of a more recent date is provided with more weight than an instance of the address used in a message of a less recent date.

7. The method of claim 1, wherein one of the names of the persons is identified via the computer automatically querying a server over a computer network.

8. The method of claim 7, wherein the server is one of: a web server engine, an online directory, a social network server, and a media sharing website.

9. The method of claim 1, wherein the one or more suggestions are a first set of suggestions, and the method further comprises:
obtaining a second set of suggestions from a message compose window; and
presenting the first and second sets of suggestions in a window.

10. The method of claim 9, wherein the first and second sets of suggestions are presented as separate lists.

11. The method of claim 9, further comprising:
preventing the message compose window from presenting the second set of suggestions in a separate window.

12. The method of claim 1, wherein the messages are email messages; and the addresses are email addresses.

13. The method of claim 1, wherein the addresses are one of: email addresses, instant messaging user names, and phone numbers.

14. The method of claim 1, wherein the one or more suggestions are presented for selection on a browser running on a user terminal remote from the computer.

15. The computer implemented method of claim 1, wherein each profile of the plurality of profiles further comprises information about the respective person that is available online during creation or updating of the profile for the respective person as a result received from a web search engine or an online directory in response to a search query.

16. The computer implemented method of claim 1, wherein each profile of the plurality of profiles further comprises information about the respective person that is publicly available on a social network site during creation or updating of the profile for the respective person.

17. The computer implemented method of claim 1, wherein the identifying the set of persons comprises matching the incomplete input to at least one field of the plurality of profiles other than a name field.

18. A user terminal, comprising:
a storage device to store a set of messages for a user;
a profile builder to scan the set of messages to identify a plurality of addresses, to identify names of persons at the addresses to generate a plurality of profiles for the persons, to compute scores of the addresses to determine relevancy of the addresses to the user, each profile of the plurality of profiles comprising a name of a respective person, an address for the respective person, a date of the last message sent to or received from the respective person, and a total number of messages sent to or received from the respective person; and
a profile presenter to identify, in response to an incomplete input in an address field presented on the user terminal, a set of persons in the plurality of profiles that match the incomplete input, to sort the set of persons based at least in part on the scores, to present one or more suggestions to complete the incomplete input based on the set of persons, and to replace the incomplete input with an address corresponding to a suggestion selected by the user in response to the user selecting the suggestion from the one or more suggestions, the profile presenter to identify the set of persons by matching the incomplete input to a plurality of fields in the profiles, wherein the incomplete input is matched to at least one field of the plurality of fields other than an address field.

19. The user terminal of claim 18, wherein the profile builder and the profile presenter are implemented via at least one processor and a memory storing a set of instructions for the processor.

20. The user terminal of claim 18, wherein at least a portion of the profile builder and the profile presenter is implemented via an application specific integrated circuit (ASIC) or Field-Programmable Gate Array (FPGA).

21. A non-transitory machine readable storage media storing a set of instructions, the instructions causing a processor to perform a method, the method comprising:
scanning, by the processor, a set of messages of a user to identify a plurality of addresses;
identifying names of persons at the addresses to generate a plurality of profiles for the persons, each profile of the plurality of profiles comprising a name of a respective person, an address for the respective person, and a total number of messages sent to or received from the respective person;
computing scores of the persons using data in the plurality of profiles to determine relevancy of the persons to the user;
in response to an incomplete input in an address field, identifying a set of persons in the plurality of profiles that match the incomplete input, the identifying comprising matching the incomplete input to a plurality of fields in the profiles, wherein the plurality of fields includes at least two of: a person's name, an employer, a domain name, a job title, and a city name;
sorting the set of persons based at least in part on the scores;
presenting one or more suggestions to complete the incomplete input based on the set of persons; and
in response to the user selecting a suggestion from the one or more suggestions, replacing the incomplete input with an address corresponding to the suggestion selected by the user.

22. The non-transitory machine readable storage media of claim 21, wherein the sorting comprises weighting the scores according to types of fields in the plurality of profiles to which the incomplete input matches.

* * * * *